US012020123B2

(12) United States Patent
van Kollenburg et al.

(10) Patent No.: US 12,020,123 B2
(45) Date of Patent: Jun. 25, 2024

(54) USER-CUSTOMISABLE MACHINE LEARNING MODELS

(71) Applicant: KONINKLIJKE PHILIPS N.V., Eindhoven (NL)

(72) Inventors: Johanna Wilhemina Maria van Kollenburg, Best (NL); Sander Bogers, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 240 days.

(21) Appl. No.: 16/680,012

(22) Filed: Nov. 11, 2019

(65) Prior Publication Data

US 2020/0160217 A1 May 21, 2020

Related U.S. Application Data

(60) Provisional application No. 62/769,778, filed on Nov. 20, 2018.

(51) Int. Cl.
*G06N 20/00* (2019.01)
*G06F 3/0481* (2022.01)

(52) U.S. Cl.
CPC ........... *G06N 20/00* (2019.01); *G06F 3/0481* (2013.01)

(58) Field of Classification Search
CPC .............................. G06N 20/00; G06F 3/0481
USPC .......................................................... 706/11
See application file for complete search history.

(56) References Cited

U.S. PATENT DOCUMENTS

| | | | | |
|---|---|---|---|---|
| 10,064,711 | B1* | 9/2018 | Richter | A61C 17/221 |
| 10,168,677 | B2 | 1/2019 | Funes | |
| 2002/0183959 | A1* | 12/2002 | Savill | A46B 15/0006 |
| | | | | 702/150 |
| 2009/0291422 | A1* | 11/2009 | Puurunen | A46B 15/0002 |
| | | | | 434/263 |
| 2012/0317064 | A1* | 12/2012 | Hagiwara | A61B 5/6898 |
| | | | | 706/46 |

(Continued)

FOREIGN PATENT DOCUMENTS

WO 2016085942 A1 6/2016

OTHER PUBLICATIONS

Najarian et al., "A learning-theory-based training algorithm for variable-structure dynamic neural modeling", International Joint Conference on Neural Networks. Proceedings, vol. 1, pp. 477-482, 1999 IEEE. (Year: 1999).*

(Continued)

*Primary Examiner* — Hwei-Min Lu

(57) ABSTRACT

An apparatus for providing a user-customisable machine learning model, MLM, the apparatus including: (i) one or more processing units configured to: receive measurements from one or more sensors that monitor one or more aspects of a user, an object, or an environment of the user; (ii) receive, via a user interface, one or more user-defined labels for one or more parts of the received measurements; (iii) form a training measurement set from the one or more parts and the one or more user-defined labels; and (iv) train an MLM with the training measurement set to generate a trained MLM, wherein the trained MLM is such that the trained MLM is able to determine one or more user-defined labels for further measurements received from the one or more sensors.

16 Claims, 4 Drawing Sheets

(56) References Cited

U.S. PATENT DOCUMENTS

| | | | |
|---|---|---|---|
| 2013/0137074 A1* | 5/2013 | Meriheinae | A46B 15/0044 |
| | | | 434/263 |
| 2014/0065588 A1* | 3/2014 | Jacobson | A61C 17/225 |
| | | | 15/22.1 |
| 2015/0081703 A1* | 3/2015 | Murphy-Chutorian | ............ |
| | | | G06F 16/248 |
| | | | 707/736 |
| 2015/0164349 A1* | 6/2015 | Gopalakrishnan | A61B 5/746 |
| | | | 600/508 |
| 2016/0019282 A1* | 1/2016 | Lewis | G06F 16/93 |
| | | | 707/740 |
| 2016/0170996 A1* | 6/2016 | Frank | G06Q 30/0203 |
| | | | 707/748 |
| 2016/0180222 A1 | 6/2016 | Sierhuis et al. | |
| 2016/0217390 A1* | 7/2016 | Shoaib | G06N 20/10 |
| 2016/0371601 A1* | 12/2016 | Grove | G06N 20/00 |
| 2017/0293640 A1* | 10/2017 | Kish | G06F 18/214 |
| 2018/0096261 A1* | 4/2018 | Chu | G06N 20/20 |
| 2018/0276560 A1* | 9/2018 | Hu | G06N 20/00 |
| 2018/0285528 A1* | 10/2018 | Healey | G06N 20/00 |
| 2018/0288161 A1* | 10/2018 | Saxena | H04W 4/33 |
| 2018/0301224 A1 | 10/2018 | Matichuk et al. | |
| 2018/0306609 A1* | 10/2018 | Agarwal | G06N 20/10 |
| 2018/0330280 A1* | 11/2018 | Erenrich | G06N 20/00 |
| 2021/0267488 A1* | 9/2021 | Taghvaeeyan | A61B 5/7225 |
| 2022/0237516 A1* | 7/2022 | Schmidt | G06N 5/022 |

OTHER PUBLICATIONS

Negahban et al., "Scaling Multiple-Source Entity Resolution using Statistically Efficient Transfer Learning", CIKM '12, published on Aug. 9, 2012. (Year: 2012).*

Fred Bertsch, "Sensor Network Trained To Understand Arbitrary Labels", Technical Disclosure Commons, Aug. 29, 2018 (Year: 2018).*

* cited by examiner

USER-CUSTOMISABLE MACHINE LEARNING MODELS

FIELD OF THE INVENTION

This disclosure relates to machine learning models, and in particular to machine learning models that can be customised or tailored by a user.

BACKGROUND OF THE INVENTION

Recently, the use of machine learning has become a cornerstone of data science and is widely utilised within research environments. However, consumers typically only have access to the trained result of these activities. Without extensive expertise in computer science, a consumer is not able to utilise the potential of machine learning to suit their own needs or curiosities.

SUMMARY OF THE INVENTION

It is therefore an object to provide an apparatus, system and method that enables a user to customise the training of a machine learning model to their particular requirements or circumstances.

According to a first specific aspect, there is provided an apparatus for providing a user-customisable machine learning model, MLM, the apparatus comprising one or more processing units configured to receive measurements from one or more sensors that monitor one or more aspects of a user, an object and/or an environment of the user; receive, via a user interface, one or more user-defined labels for one or more parts of the received measurements; form a training measurement set from the one or more parts and the one or more user-defined labels; and train an MLM with the training measurement set to generate a trained MLM, wherein the trained MLM is such that the trained MLM is able to determine one or more user-defined labels for further measurements received from the one or more sensors.

In some embodiments, a part of the received measurements is the measurements for a time period identified by the user.

In some embodiments, the user interface enables the user to input the one or more user-defined labels as free text or free-form data.

In some embodiments, the one or more processing units are further configured to receive further measurements from the one or more sensors; and evaluate the received further measurements using the trained MLM to determine one or more user-defined labels for the received further measurements. In these embodiments the one or more processing units may be further configured to output, via the user interface, the determined one or more user-defined labels to the user as suggested user-defined labels for the received further measurements. In these embodiments the one or more processing units may be further configured to receive, via the user interface, an input from the user confirming or declining the suggested user-defined labels. In these embodiments the one or more processing units may be further configured to output, via the user interface, an indication of the determined one or more user-defined labels for the received further measurements. In these embodiments the one or more processing units may be further configured to receive, via the user interface, an indication that a notification is to be provided if a specific one or more of the user-defined labels is determined by the trained MLM for further measurements; and output, via the user interface, a notification to the user if the specific one or more of the user-defined labels is determined by the trained MLM for the received further measurements.

In some embodiments, the one or more sensors comprises one or more sensors selected from: a motion sensor, a movement sensor, a rotation sensor, a temperature sensor, an air pressure sensor, a humidity sensor, a sound sensor, a distance sensor, a proximity sensor, a light sensor, a magnetic field sensor, a switch, a button, a knob and a slider.

In some embodiments, the one or more sensors are part of one or more sensing modules, and wherein a sensing module comprises an attachment mechanism to enable the sensing module to be attached to the user, another person, or an object in the environment of the user.

According to a second aspect, there is provided a system, comprising one or more sensors for monitoring one or more aspects of a user, an object and/or an environment of the user; one or more user interface components configured to enable a user to input one or more user-defined labels for one or more parts of measurements from the one or more sensors; and one or more communication units for communicating the measurements from the one or more sensors to a remote apparatus and for communicating the one or more user-defined labels input by the user to the remote apparatus.

In some embodiments, the system further comprises an apparatus according to the first aspect or any embodiment thereof.

According to a third aspect, there is provided a method for providing a user-customisable machine learning model, MLM, the method comprising receiving measurements from one or more sensors that monitor one or more aspects of a user, an object and/or an environment of the user; receiving, via a user interface, one or more user-defined labels for one or more parts of the received measurements; forming a training measurement set from the one or more parts and the one or more user-defined labels; and training an MLM with the training measurement set to generate a trained MLM, wherein the trained MLM is such that the trained MLM is able to determine one or more user-defined labels for further measurements received from the one or more sensors.

In some embodiments, a part of the received measurements is the measurements for a time period identified by the user.

In some embodiments, the one or more user-defined labels are received as free text or free-form data.

In some embodiments, the method further comprises the steps of: receiving further measurements from the one or more sensors; and evaluating the received further measurements using the trained MLM to determine one or more user-defined labels for the received further measurements. In these embodiments the method may further comprise the step of outputting, via the user interface, the determined one or more user-defined labels to the user as suggested user-defined labels for the received further measurements. In these embodiments the method may further comprise receiving, via the user interface, an input from the user confirming or declining the suggested user-defined labels. In these embodiments the method may further comprise outputting, via the user interface, an indication of the determined one or more user-defined labels for the received further measurements. In these embodiments the method may further comprise the steps of receiving, via the user interface, an indication that a notification is to be provided if a specific one or more of the user-defined labels is determined by the trained MLM for further measurements; and outputting, via the user interface, a notification to the user if the specific one or more of the user-defined labels is determined by the trained MLM for the received further measurements.

In some embodiments, the one or more sensors comprises one or more sensors selected from: a motion sensor, a movement sensor, a rotation sensor, a temperature sensor, an air pressure sensor, a humidity sensor, a sound sensor, a distance sensor, a proximity sensor, a light sensor, a magnetic field sensor, a switch, a button, a knob and a slider.

In some embodiments, the one or more sensors are part of one or more sensing modules, and wherein a sensing module comprises an attachment mechanism to enable the sensing module to be attached to the user, another person, or an object in the environment of the user.

According to a fourth aspect, there is provided a computer program product comprising a computer readable medium having computer readable code embodied therein, the computer readable code being configured such that, on execution by a suitable computer or processor, the computer or processor is caused to perform the method of the third aspect or any embodiment thereof.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF EMBODIMENTS

As noted above, the data or information that is meaningful to an end-user is very diverse and can change over time. It is therefore desirable to provide users (particularly consumers with limited technical knowledge) with the ability to use machine learning models, and in particular to provide users with the ability to customise the training of a machine learning model to their particular requirements or circumstances. This can enable a user to gain insight to the link between behaviour and experience data that is very personal to the user. With sensors that are multi-purpose and can be easily relocated or repositioned by the user (e.g. they can be used to monitor a number of different aspects of the user, objects and/or the environment, and the monitored aspects or the monitored user or object can be changed over time), the user can experiment with the sensors and machine learning model to find relevant insights that might be otherwise hard to grasp.

Thus, according to the techniques described herein, one or more sensors are used to measure some aspect of the user, some aspect of an object that the user can use or is using, and/or some aspect of the environment of the user, and the user is provided with a user interface that enables the user to apply labels to the measurements from the sensor(s). These labels can be anything that the user wishes or requires, and could, for example, indicate that a part of measurements of the motion of an object relate to the user brushing their teeth, that a part of the measurements relate to the user having a shower, that a part of the measurements relate to the user rocking a baby to sleep, etc. As the user is free to set the labels as they wish or require (for example the labels can be input using free text or be free form data), the labels can therefore relate to more than just the actions of the user or interactions with an object, but can also relate to the user's experience, for example, a part of the measurements of an object can be labelled as 'brushing teeth really thoroughly', whereas another part of the measurements of the object can be labelled as 'brushing teeth in a rush'. As another example, a part of the measurements can be labelled as 'rocking a baby to sleep—took a long time', whereas another part of the measurements can be labelled as 'rocking the baby to sleep—baby settled well'. The user-defined labels can also be referred to as user-defined tags.

The labels and sensor measurements are used to form a training set for a machine learning model, and the machine learning model is trained using the training set and sensor measurements so that the machine learning model is able to predict whether a user-defined label is applicable to subsequently received sensor measurements.

Once trained, the machine learning model can be used on subsequently received sensor measurements to determine whether any of the user-defined labels are applicable to the, or part of the, sensor measurements.

Figure 1:
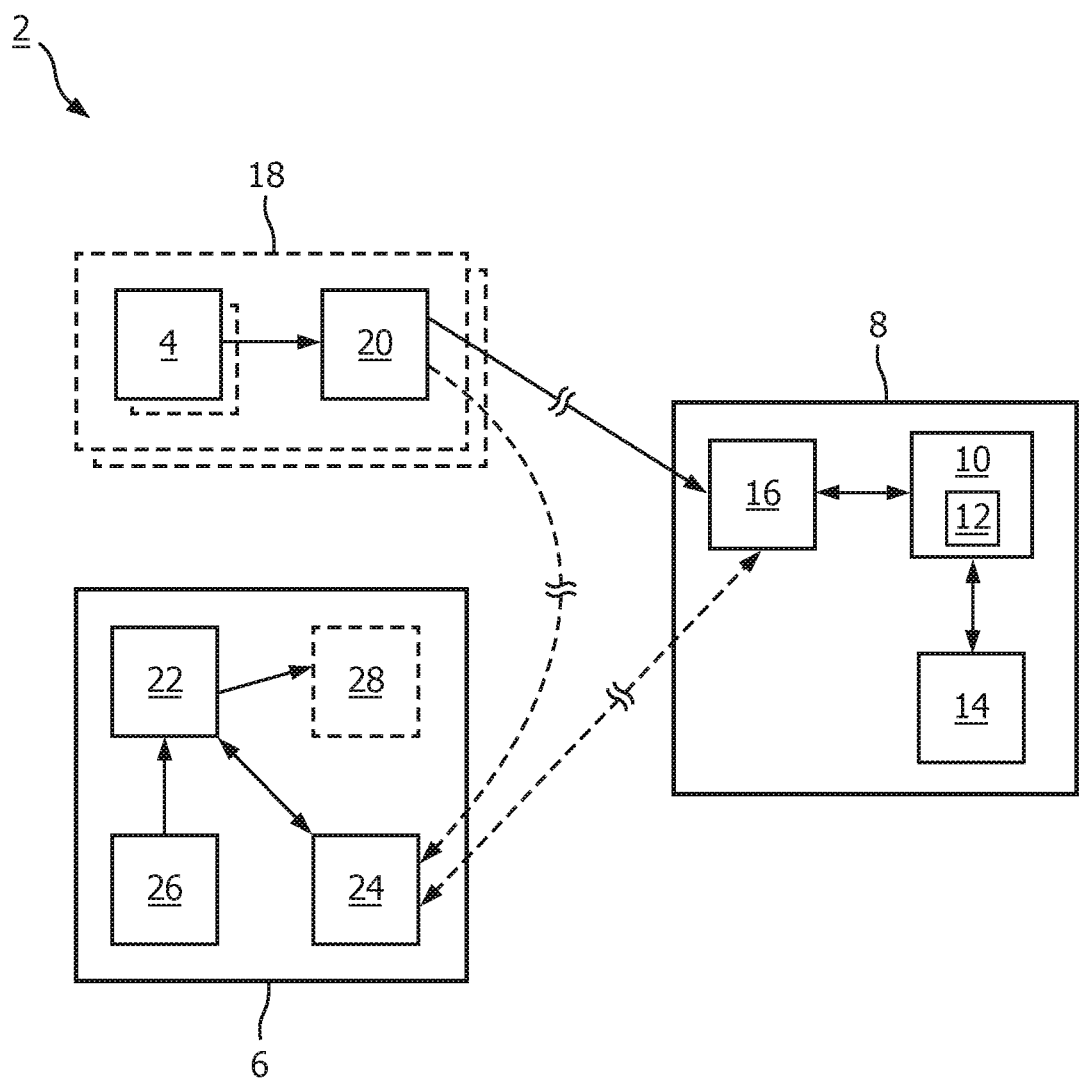
FIG. 1 is a block diagram illustrating a system according to an exemplary embodiment.

An exemplary system that can be used to implement the above techniques is shown in FIG. 1. Broadly, the system 2 comprises one or more sensors 4 for acquiring measurements of one or more aspects of a user, an object and/or an environment of the user, a user device 6 that is for enabling the user to input user-defined labels for the sensor measurements, and an apparatus 8 that is for training a machine learning model (MLM) to identify parts of subsequent sensor measurements that are to be labelled with a user-defined label.

FIG. 1 shows the sensor(s) 4, user device 6 and apparatus 8 as separate entities, but it will be appreciated from the description below that one or more of these entities can be combined into a single entity. For example, the functionality of the user device 6 and the apparatus 8 can be provided by a single device/apparatus.

The apparatus 8 includes a processing unit 10 that controls the operation of the apparatus 8 and that can be configured to execute or perform the methods, or part of the methods, described herein. For example the processing unit 10 can receive sensor measurements and one or more labels that a user has applied to or specified for the sensor measurements, and the processing unit 10 can train a machine learning model 12 to identify parts of subsequent sensor measurements that are to be labelled with the user-defined label.

The processing unit 10 can be implemented in numerous ways, with software and/or hardware, to perform the various functions described herein. The processing unit 10 may comprise one or more microprocessors or digital signal processor (DSPs) that may be programmed using software or computer program code to perform the required functions and/or to control components of the processing unit 10 to effect the required functions. The processing unit 10 may be implemented as a combination of dedicated hardware to perform some functions (e.g. amplifiers, pre-amplifiers, analog-to-digital convertors (ADCs) and/or digital-to-analog convertors (DACs)) and a processor (e.g., one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

The processing unit 10 is connected to a memory unit 14 that can store data, information and/or signals for use by the processing unit 10 in controlling the operation of the apparatus 8 and/or in executing or performing the methods described herein. In some implementations the memory unit 14 stores computer-readable code that can be executed by the processing unit 10 so that the processing unit 10 performs one or more functions, including the methods described herein. The memory unit 14 can comprise any type of non-transitory machine-readable medium, such as cache or system memory including volatile and non-volatile computer memory such as random access memory (RAM) static RAM (SRAM), dynamic RAM (DRAM), read-only memory (ROM), programmable ROM (PROM), erasable PROM (EPROM) and electrically erasable PROM (EEPROM), implemented in the form of a memory chip, an optical disk (such as a compact disc (CD), a digital versatile disc (DVD) or a Blu-Ray disc), a hard disk, a tape storage solution, or a solid state device, including a memory stick, a solid state drive (SSD), a memory card, etc.

In this illustrated embodiment, the apparatus 8 is separate from the one more sensors 4 and the user device 6, and the apparatus 8 needs to be able to communicate with the sensor(s) 4 and/or the user device 6. Therefore the apparatus 8 also includes interface circuitry 16 for enabling a data connection to and/or data exchange with other devices, including the user device 6 and/or sensor(s) 4. The interface circuitry 16 may also enable data exchange with one or more servers and/or databases, and optionally one or more other user devices and sensors (e.g. those used by different users).

The connection may be direct or indirect (e.g. via the Internet), and thus the interface circuitry 16 can enable a connection between the apparatus 8 and a network, such as the Internet, via any desirable wired or wireless communication protocol. For example, the interface circuitry 16 can operate using Wi-Fi wireless communication, BLUETOOTH® wireless communication, ZIGBEE® wireless communication, or any cellular communication protocol (including but not limited to Global System for Mobile Communications (GSM), Universal Mobile Telecommunications System (UMTS), Long Term Evolution (LTE), LTE-Advanced, etc.). In the case of a wireless connection, the interface circuitry 16 (and thus apparatus 8) may include one or more suitable antennas for transmitting/receiving over a transmission medium (e.g. the air). Alternatively, in the case of a wireless connection, the interface circuitry 16 may include means (e.g. a connector or plug) to enable the interface circuitry 16 to be connected to one or more suitable antennas external to the apparatus 8 for transmitting/receiving over a transmission medium (e.g. the air). The interface circuitry 16 is connected to the processing unit 10.

Optionally, the apparatus 8 can comprise a user interface (not shown in FIG. 1) that includes one or more components that enables a user of apparatus 8 to input information, data and/or commands into the apparatus 8, and/or enables the apparatus 8 to output information or data to the user of the apparatus 8. The user interface can comprise any suitable input component(s), including but not limited to a keyboard, keypad, one or more buttons, switches or dials, a mouse, a track pad, a touchscreen, a stylus, a camera, a microphone, etc., and the user interface WW can comprise any suitable output component(s), including but not limited to a display screen, one or more lights or light elements, one or more loudspeakers, a vibrating element, etc.

The apparatus 8 can be any type of electronic device or computing device. In some implementations, the apparatus 8 can be, or be part of, a laptop, a tablet, a smartphone, a smartwatch, etc. In other implementations, the apparatus 8 is an apparatus that is present or used in the home or care environment of the subject/user. For example, the apparatus 8 can be, or be part of, a laptop, a tablet, a smartphone, a smartwatch, or a computer. In other implementations, the apparatus 8 is an apparatus that is remote from the subject/user, and remote from the home or care environment of the subject/user. For example, the apparatus 8 can be a server, for example a server in a data centre (also referred to as being 'in the cloud').

It will be appreciated that a practical implementation of an apparatus 8 may include additional components to those shown in FIG. 1. For example the apparatus 8 may also include a power supply, such as a battery, or components for enabling the apparatus 8 to be connected to a mains power supply.

The one or more sensors 4 can include any type or types of sensor for acquiring measurements of one or more aspects of a user, an object and/or an environment of the user. The one or more sensors 4 can include one or more sensors for measuring any aspect of the user, including, but not limited to, the motion of the user, the movement of the user, the orientation of the user (e.g. with respect to gravity), the presence of the user in a particular room or area, the heart rate of the user, the breathing rate of the user, the skin temperature of the user, the skin conductivity of the user, any other physiological characteristic of the user.

The one or more sensors 4 can include one or more sensors for measuring any aspect of any (type of) object. The object can be a household object, for example a toothbrush, a shaver, a kettle, a light switch, a television, a computer, a smartphone, a door, a bicycle, exercise equipment, a bath tap, etc. The one or more sensors 4 can measure any aspect of the object, including, but not limited to, the motion of the object, the movement of the object, the orientation of the object (e.g. with respect to gravity), the temperature of the object, whether the object is switched on or off, whether the user is using the object, etc.

The one or more sensors 4 can include one or more sensors for measuring any aspect of an environment of the user, including, but not limited to, motion in the environment or a part of the environment, movement in the environment or a part of the environment, the presence of the user or another person (or animal) in the environment or a part of the environment, the temperature of the environment, the humidity of the environment, etc.

To monitor any of the aspects of the user, object and/or environment mentioned above, the one or more sensors 4 can include one or more sensors selected from: a motion sensor, a movement sensor, a rotation sensor, a temperature sensor, an air pressure sensor, a humidity sensor, a sound sensor, a distance sensor, a proximity sensor, a light sensor, a magnetic field sensor, a switch, a button, a knob and a slider.

In the embodiment illustrated in FIG. 1, the one or more sensors 4 are part of one or more sensing modules 18, with each sensing module 18 comprising one or more of the sensors 4, and interface circuitry 20 for communicating the measurements output by the sensor(s) 4 to the apparatus 8 and/or to the user device 6. The interface circuitry 20 can be any type of interface circuitry, and, for example, the interface circuitry 20 can be implemented according to the options described above for the interface circuitry 16 in the apparatus 8.

One or more of the sensing modules 18 can comprise an attachment mechanism that enables the sensing module 18 to be attached to the user, another person, or an object in the environment of the user. The attachment mechanism can be any of, a strap, a belt, an elasticated band, an adhesive, a suction pad, a clip, etc.

For example, for a sensing module 18 that is to be used to monitor the activities of a user, the sensing module 18 can include an accelerometer and gyroscope, and include an attachment mechanism in the form of a band so that the sensing module 18 can be worn on an arm of the user.

It will be appreciated that a sensing module 18 may include additional components to those shown in FIG. 1. For example a sensing module 18 may also include a power supply, such as a battery, or components for enabling the sensing module 18 to be connected to a mains power supply. A sensing module 18 may also include a memory unit for storing sensor measurements until the sensor measurements are to be transmitted to the apparatus 8 and/or user device 6.

The user device 6, which is for enabling the user to input user-defined labels for the sensor measurements, comprises a processing unit 22, interface circuitry 24 for enabling communications with the apparatus 8 and optionally with the one or more sensors 4 (or one or more sensing modules 18), a user interface input component 26 and a display 28.

The processing unit 22 controls the operation of the user device 6 and can be configured to execute or perform the methods, or part of the methods, described herein. For example the processing unit 22 can receive sensor measurements (either directly from the sensor(s) 4 or from the apparatus 8), cause the display of the sensor measurements or information relating to the sensor measurements on the display 28 and receive one or more user-defined labels for the sensor measurements via the user interface input component 26 (e.g. a keyboard or a touch-screen). The processing unit 22 can be any type of processing unit, and, for example, the processing unit 22 can be implemented according to the options described above for the processing unit 10 in the apparatus 8.

The interface circuitry 24 can be any type of interface circuitry, and, for example, the interface circuitry 24 can be implemented according to the options described above for the interface circuitry 16 in the apparatus 8.

The display 28 can be any type of screen that can be used to display data or information to the user. It will be appreciated that the user device 6 can include one or more other types of user interface output components in addition to the display 28, for example, one or more lights or light elements, one or more loudspeakers, a vibrating element, etc.

The user interface input component 26 can be any type of component that enables the user (or another person) to input one or more user-defined labels and an indication of the sensor measurement or measurements that the label applies to. The user interface input component 26 can be, but is not limited to, a keyboard, keypad, one or more buttons, switches or dials, a mouse, a track pad, a touchscreen, a stylus, a camera, a microphone, etc. The user interface input component 26 can also be used to enable the user to input other information, data and/or commands into the user device 6.

The user device 6 can be any type of electronic device or computing device. In some implementations, the user device 6 can be, or be part of, a laptop, a tablet, a smartphone, a smartwatch, etc. In other implementations, the user device 6 is a device that is present or used in the home or care environment of the subject/user. For example, the user device 6 can be, or be part of, a laptop, a tablet, a smartphone, a smartwatch, or a computer.

It will be appreciated that a practical implementation of a user device 6 may include additional components to those shown in FIG. 1. For example the user device 6 may also include a power supply, such as a battery, or components for enabling the user device 6 to be connected to a mains power supply.

Figure 2:
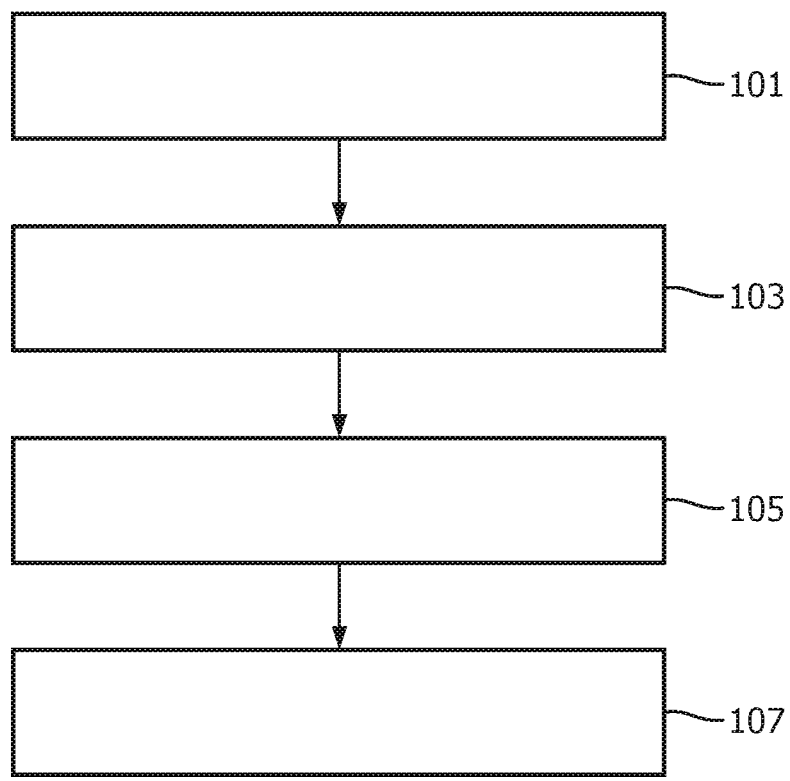
FIG. 2 is a flow chart illustrating a method according to an exemplary embodiment.

The flow chart in FIG. 2 illustrates an exemplary method according to the techniques described herein. One or more of the steps of the method can be performed by the processing unit 10 in the apparatus 8, in conjunction with any of the memory unit 14 and interface circuitry 16 as appropriate. The processing unit 10 may perform the one or more steps in response to executing computer program code, that can be stored on a computer readable medium, such as, for example, the memory unit 14.

In step 101, the apparatus 8 receives measurements from one or more sensors 4 that are monitoring one or more aspects of a user, an object and/or an environment of the user. Step 101 can comprise the apparatus 8 receiving the measurements in real-time or near real-time (e.g. as the measurements are made by the sensor(s) 4). Alternatively, step 101 can comprise receiving periodic or intermittent transmissions of sensor measurements from the sensor(s) 4 or sensing module(s) 18. Alternatively, step 101 can comprise retrieving sensor measurements from the memory unit 14 (e.g. where the sensor measurements were received previously and stored for subsequent analysis).

In step 103, the apparatus 8 receives one or more user-defined labels for one or more parts of the received measurements. The user-defined labels are input by the user using a user interface input component. In the illustrated embodiment of FIG. 1, the user-defined labels are input by the user using user interface input component 26 (e.g. a keyboard or touchscreen) in the user device 6, and the user-defined labels (or information/data representing the user-defined labels) are communicated to the apparatus 8. In alternative embodiments, the user interface input component used to input the user-defined labels can be part of the apparatus 8.

Each user-defined label received in step 103 indicates the part of the sensor measurements that the label applies to. This indication can be, for example, in the form of a time or a time period that the label applies to. If measurements are received in step 101 from multiple sensors 4, the information received in step 103 may include an indication of which set (or sets) of measurements the label applies to. For example, a plurality of sensors 4 may respectively monitor the movements of a plurality of objects, and the user may have only used one of the objects (e.g. a shaver) in a particular time period, and therefore the label can indicate that the label applies to the measurements of that object (the shaver).

The labels are user-defined, which means that the user is free to define what the label is, and what measurements the label is applied to. In some embodiments, the user enters the label into the user interface input component as free text or as free form data (with free form data including any of text, numbers, an image or drawing, a sound, etc.). That is, the label can be input as unstructured data. As the user is free to define the label for any part of the sensor measurements, the user is able to control the types of activities, events or experiences that are labelled in the sensor measurements.

In step 105, the apparatus 8/processing unit 10 forms a training measurement set from the one or more parts of the sensor measurements that have been labelled, and the one or more user-defined labels for those parts.

Once the training measurement set is sufficiently large, a machine learning model (MLM) is trained using the training measurement set to generate a trained MLM (step 107). The number of data elements (tuples) in a training measurement set (i.e. the number of labelled parts of the sensor measurements and the associated user-defined label for each of those parts) for it to be considered 'sufficiently large' depends on a number of factors. For example, it can depend on whether the type of sensor measurements/sensor data that is labelled is very simple (e.g. just a binary on/off pattern, such as for a light switch) or very complex (e.g. sensor measurements for one or more parameters where each parameter can have, for example, a value between 0 and 255). It can also or alternatively depend on the user-defined label, and in a case where the label relates to an earlier label, it might be that less data elements are needed. It can also or alternatively depend on whether the training process can use sensor measurements and user-defined labels from other users, or if the training measurement set is expanded to include sensor measurements and user-defined labels from other users. For example if several users add a motion sensor to their shower door, and all label the motion sensors measurements as 'shower door', then the training process can also use the motion sensor data of earlier users. It can also or alternatively depend on the frequency with which the labelled action or experience happens. For example, an activity labelled 'toothbrushing' is likely to happen more frequently than the event 'sensitive teeth after toothbrushing', and therefore training a MLM to identify sensor measurements to which the latter label applies is likely to need a bigger training measurement set before patterns can be found (or before the MLM is more accurate at identifying the patterns).

In practical terms, a training measurement set can be determined as being sufficiently large if the number of data elements in the training measurement set is greater than a threshold number. Alternatively, a training measurement set can be determined as being sufficiently large if the number of data elements in the training measurement set labelled with a particular user-defined label is greater than a threshold number. It will be appreciated that it is not necessary (or necessarily possible) to result in a trained MLM that is 100% accurate, and it will be appreciated that the accuracy of the trained MLM will typically increase the larger the size of the training measurement set.

The MLM is trained so that, when provided with further (unlabelled) sensor measurements, the trained MLM is able to determine whether any of the user-defined labels apply to those further measurements. Through the use of the user-defined labels, the MLM is trained based on the personal information/requirements/preferences of the user, and thus can provide useful insights to the user on their behaviour and experiences.

The machine learning model can be any type of machine learning model, and for example, the MLM can be random forest-based, a support vector machine (SVM) or a recurrent neural network (RNN).

The MLM can be trained using any suitable MLM training technique, and for example, the MLM can be trained by identifying attributes of parts of the sensor measurements labelled with the same user-defined label (e.g. the attributes could be any of the average amplitude, the peak amplitude, the signal frequency, etc.), and the attributes for these parts could be compared to each other to determine whether any (or all) of the attributes are indicative or associated with the user-defined label. Other parts of the sensor measurements can be searched for these attributes to determine if that part has the user-defined label, or should have the user-defined label.

Once the MLM is trained, it can be used to evaluate further sensor measurements to determine whether any of the (previously-used) user-defined labels apply. Thus, in some embodiments, the method can further comprise receiving further measurements from the one or more sensors 4 (this step can be performed in a similar way to step 101), and the trained MLM can be used to evaluate the further measurements to determine one or more user-defined labels for the received further measurements. Using the example above, the trained MLM will have one or more attributes for a particular user-defined label, and the MLM will search for those attributes in the further measurements. If those attributes are found, the MLM can label that part of the further measurements with the user-defined label.

The apparatus 8/processing unit 10 can output any possible labels determined using the trained MLM to the user for evaluation/approval by the user. These suggested user-defined labels for the further measurements can be output to the user using the display 28 in the user device 6 (or via a display in the apparatus 8 in embodiments where the user device 6 and the apparatus 8 are a single device/apparatus), and the user can indicate, for example using the user interface input component 26, whether any of the suggested user-defined labels are correct or appropriate. In some embodiments, the user can provide an input for each suggested label confirming the label or declining the label. In some embodiments, the feedback from the user (both positive and negative) can be used when next training or retraining the MLM to improve the accuracy of the trained MLM.

As an alternative to the apparatus 8/processing unit 10 outputting the determined label(s) as suggestions, the apparatus 8/processing unit 10 can alternatively output the determined label(s) for the received further measurements to the user (e.g. via the display 28), and/or store the determined label(s) with the sensor measurements.

In some embodiments, the apparatus 8 can be used to provide a notification (such as an alarm, an alert or a message), if a particular label is determined by the trained MLM. Thus, the user (or another person) can input a rule or indication (e.g. via the user interface input component 26) that a notification is to be provided if a specific one or more of the user-defined labels is determined from the further measurements by the trained MLM. If the specific label is determined for any further sensor measurements, then the notification can be provided to the user (or other person).

Figure 3:
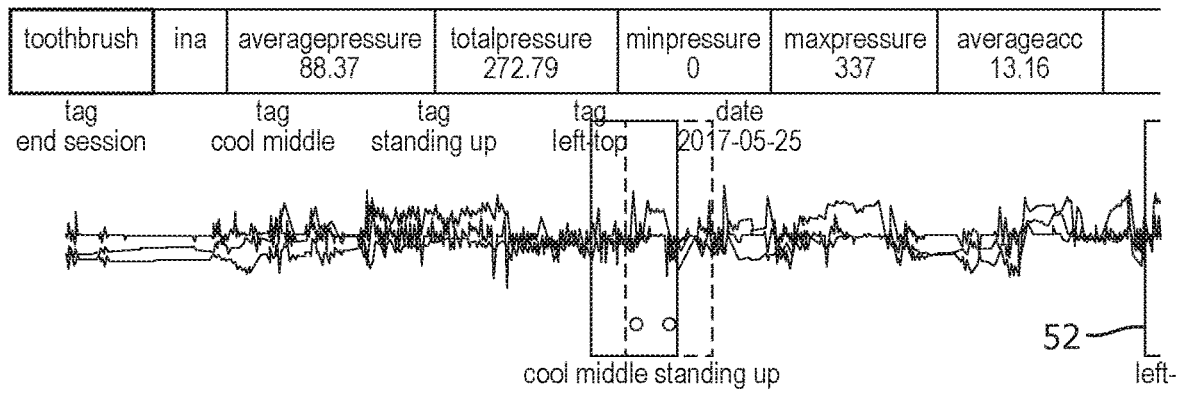
FIG. 3 is a set of graphs showing exemplary sensor measurements and user-defined labels.
Figure 3:
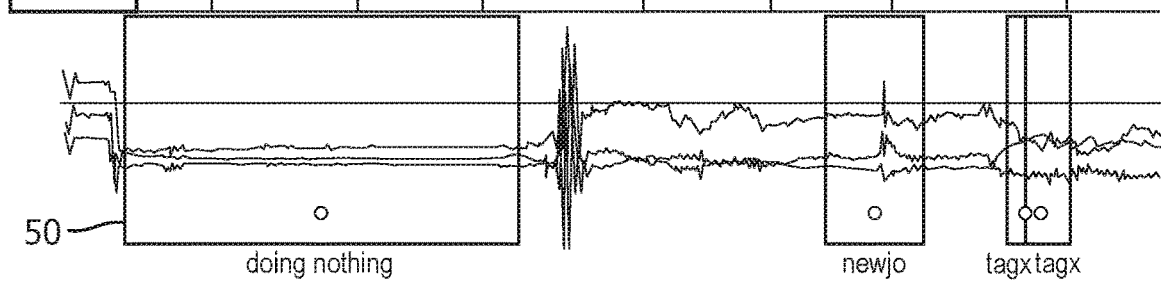
Figure 3:
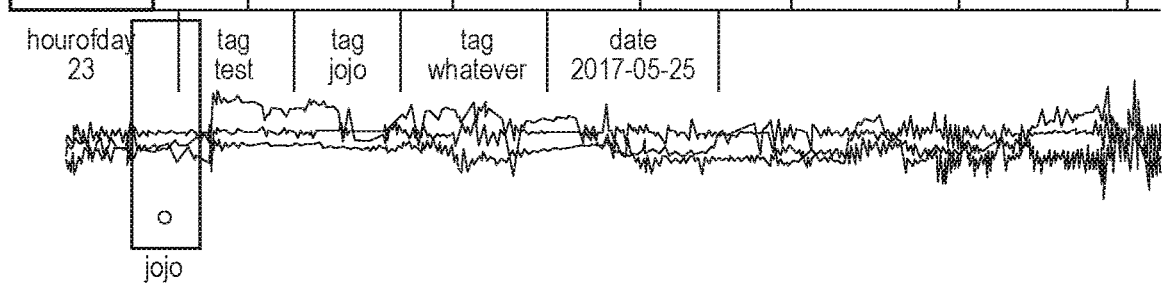
Figure 3:
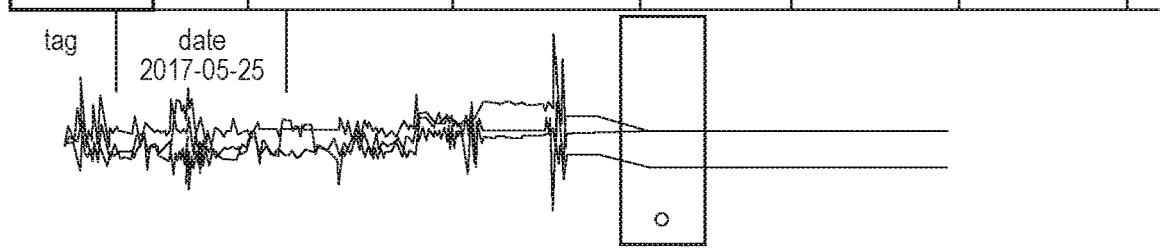
Figure 3:
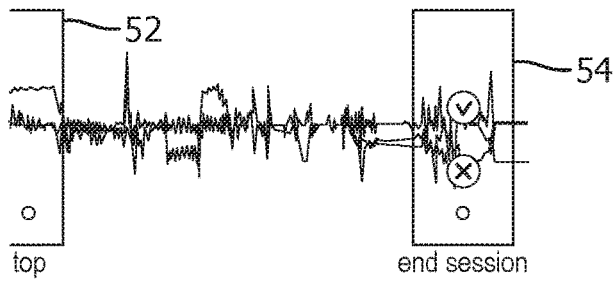
Figure 3:
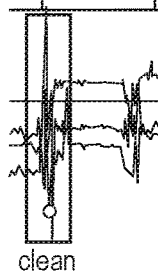
Figure 3:
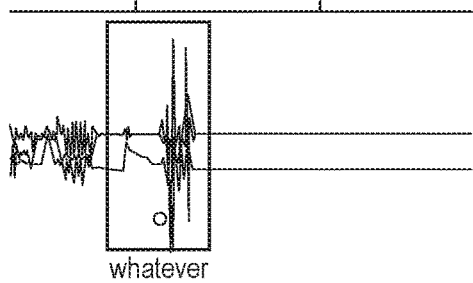

FIG. 3 shows an exemplary set of sensor measurements obtained from an accelerometer that is attached to a toothbrush. These sensor measurements may be presented as part of a user interface for the user.

Each plot in FIG. 3 shows a set of measurements from an accelerometer, with separate signal traces for each of the x, y and z measurement axes of the accelerometer. Some parts of the measurements have been labelled with user-defined labels. For example, part 50 has been labelled 'doing nothing', which the user used to indicate that the toothbrush wasn't being moved or used. Part 52 has been labelled 'left-top', which the user used to indicate that the top left part of the mouth was being brushed by the toothbrush. Part 54 is a suggested label provided by the trained MLM, and in particular the suggested label is 'end session' referring to the end of a toothbrushing session by the user. This suggested label includes 'accept' and 'decline' buttons which can be used by the user to indicate whether the trained MLM has accurately identified a part of the measurements that should be labelled with 'end session'.

In some embodiments, the user interface can enable the user to select parts (of any required size) of the sensor measurements and input a user-defined label (or select a previously-input user-defined label that is also appropriate for the selected part).

In some embodiments, the user interface can enable multiple parts of the sensor measurements to be labelled with a single instance of a user-defined label (i.e. a user-defined label can correspond to multiple separate parts of the sensor measurements).

In some embodiments, the user interface can be used by the user to input a user-defined label for at the point or before a relevant event starts, with that user-defined label being applied to the subsequently obtained sensor measurements.

In some embodiments, the user interface can allow a user to review labels that they have input and labels suggested by the trained MLM. In some embodiments, the trained MLM could highlight or indicate other parts of the sensor measurements that relate to a selected user-defined label. The user can indicate whether the label applies to these parts or not.

In some embodiments, the user interface can enable the user to 'score' a suggested label rather than indicate that a suggested label was right or wrong. For example, the user could use a scale to indicate a degree of appropriateness for a label, e.g., the suggested label is 80% accurate.

In some embodiments, each label on the sensor measurements can have an accuracy score. A label input by the user can have an "expected accuracy score" of 100%. For a label suggested by the trained MLM, the MLM can indicate the accuracy of the suggested label. For example the MLM could indicate that the accuracy score for a MLM-suggested label is only 50%.

It will be noted that in FIG. 3 that are parts of the sensor measurements that have more than one label, and thus it is possible for more than one user-defined label to apply to the same sensor measurement. For example, one label could be a 'toothbrushing' event, with different parts of the toothbrushing event labelled as 'brushing front teeth', brushing back teeth', etc.

Thus, the apparatus 8 and method outlined above enable a user to collect information on their activities and behaviour and to train a MLM to recognise those activities and behaviour in future sensor measurements.

In particular embodiments, a user can obtain (e.g. buy) a kit that includes a user device 6 (or software for implementing the user device 6 functionality on an existing electronic device of the user, such as a smartphone, tablet, laptop, computer, etc.) and a number of sensors 4 (of one or more types) that the user can place as they wish around their environment, on objects or on their person, and the measurements can be collected over time and labelled by the user using the user device 6. The measurements can be uploaded to a remote apparatus 8 for analysis and use in training a MLM. Alternatively, the functionality of the apparatus 8 can be implemented in the user device 6 or software for implementing the user device 6.

As an example of the use of the techniques described herein, a parent can receive a set of sensing modules 18 that they can use to monitor their baby and their behaviours/activities with respect to the baby. Once sensor measurements have been received, the parent could define themselves what data they would like to collect (and share with their healthcare provider) by applying appropriate user-defined labels to the measurements. For example, a parent may wish to find out information about how they are caring for their baby, and more specifically whether their baby has difficulty sleeping. The sensing modules 18 can be used to collect measurements relating to whether the baby is in bed, what routine the parent and baby has before bed time and at bed time. The parent can tag or label the sensor measurements over the course of several days with subjective information such as "easy evening", "good sleep", "a lot of crying", etc. Once the MLM is trained on these measurements and the labels (which express the parent's experience as well as the measurable behaviour), it is possible to provide the parent with feedback, which can be provided by the healthcare provider or the system 2. For example, the MLM could indicate what the parameters/attributes are of a "good sleep". It could, for example, indicate to the parents that what they label as a "good sleep" is: 'time to fall asleep'=low, 'sleep duration'=more than 5 hours, 'starting sleep' between 8 pm and 10 pm. This could help the parents understand what attributes lead to the feeling of a good sleep. The MLM could also review the events that happen before the user-defined label that might be of influence. For example, the MLM could indicate that "good sleep" typically or always follows a 'bed time story'. Alternatively the MLM can simply output the parameters/attributes that have been found for particular labels, which enables the user or another person to identify the feedback themselves.

In another example, a family could be provided with sensors 4 that can be attached to household devices such as a toothbrush, a shaver and a vacuum cleaner. The family members can define the type of information to collect by applying their own labels to the sensor measurements. For example, a sensor 4 can be put in the bathroom to determine the influence of moisturised skin on shaving or a sensor 4 can be put on a kitchen cabinet to determine an influence of eating candy and tooth brushing.

Other applications of the techniques described herein include:

After visiting a healthcare professional with a question about their care, a person may be asked to track certain information at home. For example, parents may be asked to track how often their baby drinks a bottle, spits and cries, in order for the healthcare professional to identify whether the baby suffers from reflux.

If a person has trouble sleeping, the person may be asked to track the activities the person undertakes in the evening. Such information is often documented in a diary style, with pen and paper. The techniques described herein can ease the process of tracking information and make the results more personal and reliable.

Research is currently ongoing into how multiple connected devices in the home can bring value to the end-user that is greater than the sum of its parts (and indeed this can be a question for the end-user as well as for manufacturers). A kit that includes a plurality of sensors 4 can be used to 'create' connected devices. For example, after visiting the dentist a person may be keener to keep good care of their teeth. Instead of buying a connected toothbrush right away, the person could apply a sensing module 18 to their toothbrush to see what information they can learn about their brushing behaviour. As an example, labelling their tooth brushing sessions for a week might indicate that the morning rush has a big impact on the quality of the tooth brushing. This can enable the person to see the value of tooth brushing data (for example that might be provided by a 'proper' connected toothbrush) for better taking better care of their teeth.

There is therefore provided an apparatus, system and method that enables a user to customise the training of a machine learning model to their particular requirements or circumstances.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An apparatus for providing a user-customisable machine learning model (MLM), the apparatus comprising: one or more processing units configured to:
   receive measurements from one or more sensors that monitor one or more aspects of one or more of a user, an object, and an environment of the user;
   receive, from the user via a user interface, one or more user-defined labels for one or more parts of the received measurements, wherein at least some of the one or more user-defined labels each comprises both the user's behavior and the user's experience during a received measurement, and wherein the user interface enables the user to input the one or more user-defined labels as free text or free-form data;
   form a training measurement set from the one or more parts of the received measurements and the one or more user-defined labels;
   determine that a number of the one or more user-defined labels for the one or more parts of the received measurements meets or exceeds a predetermined threshold, wherein the predetermined threshold is dependent upon a complexity of the received measurements from the one or more sensors;
   train, when the predetermined threshold is met or exceeded, an untrained MLM with the training measurement set to generate a trained MLM, wherein the trained MLM is such that the trained MLM is able to determine one or more MLM-determined user-defined labels for further measurements received from the one or more sensors;
   receive the further measurements from the one or more sensors;
   evaluate the received further measurements using the trained MLM to determine the one or more MLM-determined user-defined labels for the received further measurements; and
   output, via the user interface, an indication of the one or more MLM-determined user-defined labels for the received further measurements.

2. The apparatus as claimed in claim 1, wherein a part of the received measurements is the measurements for a time period identified by the user.

3. The apparatus as claimed in claim 1 wherein the one or more processing units are further configured to:
   output, via the user interface, the one or more MLM-determined user-defined labels to the user as suggested user-defined labels for the received further measurements.

4. The apparatus as claimed in claim 3, wherein the one or more processing units are further configured to:
   receive, via the user interface, an input from the user confirming or declining the suggested user-defined labels.

5. The apparatus as claimed in claim 1, wherein the one or more processing units are further configured to:
   receive, via the user interface, an indication that a notification is to be provided when a specific one of the one or more MLM-determined user-defined labels is determined by the trained MLM for the further measurements; and
   output, via the user interface, the notification to the user when the specific one of the one or more MLM-determined user-defined labels is determined by the trained MLM for the received further measurements.

6. The apparatus as claimed in claim 1, wherein the one or more sensors comprise one or more sensors selected from: a motion sensor, a movement sensor, a rotation sensor, a temperature sensor, an air pressure sensor, a humidity sensor, a sound sensor, a distance sensor, a proximity sensor, a light sensor, a magnetic field sensor, a switch, a button, a knob and a slider.

7. The apparatus as claimed in claim 1, wherein the one or more sensors are part of one or more sensing modules, and wherein a sensing module comprises an attachment mechanism to enable the sensing module to be attached to the user, another person, or an object in the environment of the user.

8. The apparatus as claimed in claim 1, wherein the one or more sensors are components of a wearable device.

9. The apparatus as claimed in claim 8, wherein the wearable device is a smartwatch.

10. A method for providing a user-customisable machine learning model (MLM), the method comprising:
   receiving measurements from one or more sensors that monitor one or more aspects of one or more of a user, an object, and an environment of the user;
   receiving, from a user via a user interface, one or more user-defined labels for one or more parts of the received measurements;
   forming a training measurement set from the one or more parts of the received measurements and the one or more user-defined labels;
   determining that a number of the one or more user-defined labels for the one or more parts of the received measurements meets or exceeds a predetermined threshold, wherein the predetermined threshold is dependent upon a complexity of the received measurements from the one or more sensors;
   training, when the predetermined threshold is met or exceeded, an untrained MLM with the training measurement set to generate a trained MLM, wherein the trained MLM is such that the trained MLM is able to determine one or more MLM-determined user-defined labels for further measurements received from the one or more sensors;
   receiving the further measurements from the one or more sensors;
   evaluating the received further measurements using the trained MLM to determine the one or more MLM-determined user-defined labels for the received further measurements; and outputting, via the user interface, an indication of the one or more MLM-determined user-defined labels for the received further measurements.

11. A computer program product comprising a non-transitory computer readable medium having computer readable code embodied therein, the computer readable code being configured such that, on execution by a suitable computer or processor, the computer or processor is caused to perform the method of claim 10.

12. The method of claim 10, wherein the training measurement set is further formed from one or more user-defined labels for one or more parts of received measurements from one or more sensors monitoring a second user.

13. The method of claim 10, further comprising:
receiving, from the user, a rule indicating that the user will be notified if a specific one of the one or more user-defined labels is identified by the trained MLM in the received further measurements;
wherein the output comprises an alert that the one or more MLM-determined user-defined labels for the received further measurements comprise the specific one of the one or more user-defined labels.

14. The method of claim 10, wherein the one or more user-defined labels for the one or more parts of the received measurements comprise two or more user-defined labels for at least one part of the received measurements.

15. A method for improving a user's oral care using a user-customisable machine learning model (MLM), comprising:
receiving measurements from one or more sensors that monitor toothbrushing by a user, wherein the received measurements comprises one or more of movement of a toothbrush throughout one or more toothbrushing sessions and an orientation of the toothbrush throughout the one or more toothbrushing sessions;
receiving, from the user via a user interface, a plurality of user-defined labels for one or more parts of the received measurements, the plurality of user-defined labels describing two or more different aspects of the monitored toothbrushing;

forming a training measurement set from the one or more parts of the received measurements and the plurality of user-defined labels;

determining that a number of the plurality of user-defined labels for the one or more parts of the received measurements meets or exceeds a predetermined threshold, wherein the predetermined threshold is dependent upon a complexity of the received measurements from the one or more sensors;

training, when the predetermined threshold is met or exceeded, an untrained MLM with the training measurement set to generate a trained MLM, wherein the trained MLM is such that the trained MLM is able to determine one or more MLM-determined user-defined labels for further measurements received from the one or more sensors, the one or more MLM-determined user-defined labels describing an aspect of the monitored toothbrushing;

receiving the further measurements from the one or more sensors during toothbrushing performed by the user after the training of the untrained MLM;

evaluating the received further measurements using the trained MLM to determine the one or more MLM-determined user-defined labels for the received further measurements; and outputting, via the user interface, an indication of the one or more MLM-determined user-defined labels for the received further measurements.

16. The method of claim 15, wherein the one or more MLM-determined user-defined labels for the received further measurements is output to the user as suggested user-defined labels for the received further measurements, and further comprising:
receiving, via the user interface, an input from the user confirming or declining the suggested user-defined labels.

\* \* \* \* \*